(12) United States Patent
Jaiswal et al.

(10) Patent No.: US 7,389,591 B2
(45) Date of Patent: Jun. 24, 2008

(54) ORIENTATION-SENSITIVE SIGNAL OUTPUT

(75) Inventors: Riten Jaiswal, Garden City, NY (US);
Francis MacDougall, Ottawa (CA)

(73) Assignee: GestureTek, Inc., New York, NY (US)

( * ) Notice: Subject to any disclaimer, the term of this patent is extended or adjusted under 35 U.S.C. 154(b) by 134 days.

(21) Appl. No.: 11/383,918

(22) Filed: May 17, 2006

(65) Prior Publication Data

US 2006/0281453 A1 Dec. 14, 2006

Related U.S. Application Data

(60) Provisional application No. 60/681,478, filed on May 17, 2005.

(51) Int. Cl.
*G01C 15/10* (2006.01)
(52) U.S. Cl. ..................... 33/366.11; 345/158
(58) Field of Classification Search ............... 33/366.11, 33/366.12, 366.14, 366.15; 345/157–158; 425/423
See application file for complete search history.

(56) References Cited

U.S. PATENT DOCUMENTS

| | | | |
|---|---|---|---|
| 6,805,506 B2 | 10/2004 | Bar-Yona | |
| 6,882,864 B2 | 4/2005 | Miyake | |
| 7,027,037 B2* | 4/2006 | Dowd | 345/170 |
| 7,038,662 B2* | 5/2006 | Noguera | 345/158 |
| 7,181,251 B2 | 2/2007 | Stöhr et al. | |
| 2003/0038778 A1* | 2/2003 | Noguera | 345/157 |
| 2007/0111750 A1* | 5/2007 | Stohr et al. | 455/550.1 |
| 2007/0186192 A1* | 8/2007 | Wigdor | 715/864 |

* cited by examiner

*Primary Examiner*—Yaritza Guadalupe-McCall
(74) *Attorney, Agent, or Firm*—Fish & Richardson P.C.

(57) ABSTRACT

The selection and output of a signal, such as an alphanumeric character, is provided depending upon the orientation of a device, such as a mobile telephone. In particular, a neutral position of a device is determined in relation to at least a first axis, the device including at least a first control associated with a first plurality of output signals, and an angular displacement of the device is measured about at least the first axis. A selection of the first control is also received, and one of the first plurality of output signals is output based at least upon the selection and the angular displacement.

27 Claims, 12 Drawing Sheets

|  | Left | Center | Right |
|---|---|---|---|
| Up | A | B | C |
| Center | a | b | c |
| Down | 2 | 2 | 2 |

Figure 10

| | Left | Center | Right |
|---|---|---|---|
| Up | ! | @ | # |
| Center | $ | % | ^ |
| Down | & | * | ( |

ORIENTATION-SENSITIVE SIGNAL OUTPUT

CROSS-REFERENCE TO RELATED APPLICATIONS

This application claims the benefit of U.S. Provisional Patent Application No. 60/681,478, filed May 17, 2005, which is incorporated herein by reference.

BACKGROUND

1. Field

The present disclosure generally relates to orientation-sensitive signal output and, in particular, relates to the selection and output of a signal, such as an alphanumeric character, based upon the orientation of a device, such as a telephone.

2. Description of the Related Art

Many devices use buttons or other controls to enter characters, such as alphanumeric characters and/or symbols. A conventional telephone, for example, uses a ten-button keypad to enter alphanumeric characters representing a telephone number or a text message. Due to device design and layout restrictions, the number of controls, or keys, on many devices is often limited, requiring that each control correspond to multiple characters. Telephones, for example, often assign the letters "J," "K," and "L," as well as the number "5" to the button labeled "5".

To enter one of the multiple characters associated with a single control, the control is repetitively selected until the signal corresponding to the desired character is output. In a telephony example, selecting the "5" button once will cause the character "J" to be output, selecting the "5" button twice will cause the character "K" to be output, selecting the "5" button three times will cause the character "L" to be output, and selecting the "5" button four times will cause the character "5" to be output.

In addition to these repetitive control selections, other controls may also need to be selected for a desired character to appear. A capitalized character or a symbol, for example, may require that the a special control be selected, or that multiple controls be selected in a confusing sequence.

Because repetitive control selection is required to cause the output of a single character, entry of characters into a device often occurs slowly. Furthermore, output of a subsequent character which is also associated with the same control requires that a predetermined amount of time pass since the prior selection of the control. When entering two consecutive characters using the same control, for example to enter "h" and "i" to form the word "hi", the predetermined amount of time must pass after the "h" character was output before the "i" may be output, or a separate control selection may be required to move a cursor to the next position. This approach, however, is both frustrating and time consuming.

Accordingly, it is desirable to provide for the enhanced output of signals, such as signals corresponding to characters, which overcomes the deficiencies of conventional signal output techniques.

SUMMARY

According to one general aspect, a method is disclosed. The method includes determining a neutral position of a device in relation to at least a first axis, the device including at least a first control associated with a first plurality of output signals, and measuring an angular displacement of the device about at least the first axis. The method also includes receiving a selection of the first control, and outputting one of the first plurality of output signals based at least upon the selection and the angular displacement.

Implementations may include one or more of the following features. For example, the neutral position of the device may be determined in relation to at least a second axis, orthogonal to the first axis, where the angular displacement may include a first-axis component and a second-axis component. Furthermore, the neutral position of the device may be determined in relation to at least a third axis orthogonal to the first axis and the second axis, where the angular displacement may include a third-axis component. The first axis, the second axis, and/or the third axis may intersect within the device.

The first control may be associated with at least three output signals, or at least nine output signals, where each of the plurality of output signals may correspond to a character, such as an alphanumeric character. The method may further include displaying the output signal, and/or displaying an indication of the angular displacement. The method may also further include defining a plurality of tilt regions about the first axis, wherein one of the first plurality of output signals is also output based upon the plurality of tilt regions. The angular displacement of the device about the first axis may be measured as 0°, where a first tilt region encompasses an angular displacement of 0°, or the first tilt region may be defined as a region encompassing approximately −30° to 0° about the first axis, where the second tilt region is defined as a region encompassing approximately 0° to +30° about the first axis. In a further aspect, a first output signal may be output if the angular displacement is within the first tilt region when the selection is received, where a second output signal may be output if the angular displacement is within the second tilt region when the selection is received. A third or fourth output signal may be output if the angular displacement is within the third or fourth tilt region, respectively, when the selection is received.

The method may also define a plurality of first-axis tilt regions about the first axis and a plurality of second-axis tilt regions about the second axis, where the one of the first plurality of output signals may also be output based upon the plurality of first-axis tilt regions and/or the plurality of second-axis tilt regions. When the selection is received, a first output signal may be output if the first-axis component is within a first first-axis tilt region and if the second-axis component is within a first second-axis tilt region, a second output signal may be output if the first-axis component is within a second first-axis tilt region and if the second-axis component is within the first second-axis tilt region, a third output signal may be output if the first-axis component is within the second first-axis tilt region and if the second-axis component is within a second second-axis tilt region, and/or a fourth output signal may be output if the first-axis component is within the second first-axis tilt region and if the second-axis component is within the second second-axis tilt region.

Alternatively, in another aspect, when the selection is received, a first output signal may be output if the first component is within a first first-axis tilt region and if the second-axis component is within a first second-axis tilt region, a second output signal may be output if the first component is within the first first-axis tilt region and if the second-axis component is within a second second-axis tilt region, a third output signal may be output if the first component is within the first first-axis tilt region and if the second-axis component is within a third second-axis tilt region, a fourth output signal may be output if the first component is within a second first-axis tilt region and if the second-axis component is within the first second-axis tilt region, a fifth output signal may be output if the first component is within the second first-axis tilt region and if the second-axis component is within the second second-axis tilt region, a sixth output signal may be output if the first component is within the second first-axis tilt region and if the third-axis component is within the third second-axis tilt region, a seventh output signal may be output if the first component is within a third first-axis tilt region and if the second-axis component is within the first second-axis tilt region, an eighth output signal may be output if the first component is within the third first-axis tilt region and if the second-axis component is within the second second-axis tilt region, and/or a ninth output signal may be output if the first component is within the third first-axis tilt region and if the second-axis component is within the third second-axis tilt region.

According to another general aspect, a device is disclosed. The device includes a tilt sensor configured to determine a neutral position of a device in relation to at least a first axis, and further configured to measure an angular displacement of the device about at least the first axis. The device also includes at least a first control associated with a first plurality of output signals, and a processor configured to receive a selection of the first control and further configured to output one of the first plurality of output signals based at least upon the selection and the angular displacement.

Implementations may include one or more of the following features. For example, the first axis and the second axis may intersect at a center of the device, or at a periphery portion of the device. The device may further include at least second through tenth controls each associated with second through tenth pluralities of output signals, respectively. The first control may be a button, and/or the device may be a telephone. The displacement signal may be measured using a tilt sensor, which may be a gyroscope. The device may further include a display configured to display the output signal, and/or configured to display an indication of the angular displacement, and the device may further include a keyboard configured to input the selection.

According to another general aspect, a computer program product, tangibly stored on a computer-readable medium, is disclosed. The computer program product is operable to cause a computer to perform operations including determining a neutral position of a device in relation to at least a first axis, the device including at least a first control associated with a first plurality of output signals, and measuring an angular displacement of the device about at least the first axis. The computer program product is also operable to cause a computer to perform operations including receiving a selection of the first control, and outputting one of the first plurality of output signals based at least upon the selection and the angular displacement.

According to another general aspect, a telephone device is disclosed. The telephone device includes a tilt sensor configured to determine a neutral position of the telephone device in relation to at least a roll axis, and further configured to measure an angular displacement of the telephone device about the roll axis. The telephone device also includes at least first through eighth buttons each associated with at least four alphanumeric characters. Furthermore, the telephone device includes a processor configured to receive a selection of the first button and further configured to output one of the at least four alphanumeric characters based at least upon the selection and the angular displacement.

The details of one or more implementations are set forth in the accompanying drawings and the description below. Other features will be apparent from the description and drawings, and from the claims.

BRIEF DESCRIPTION OF THE DRAWINGS

Referring now to the drawings, in which like reference number represent corresponding parts throughout:

FIG. 10 is a table showing one possible mapping of device orientations used to output signals corresponding to characters and cases that are output when a control is selected.

DETAILED DESCRIPTION

Figure 1:
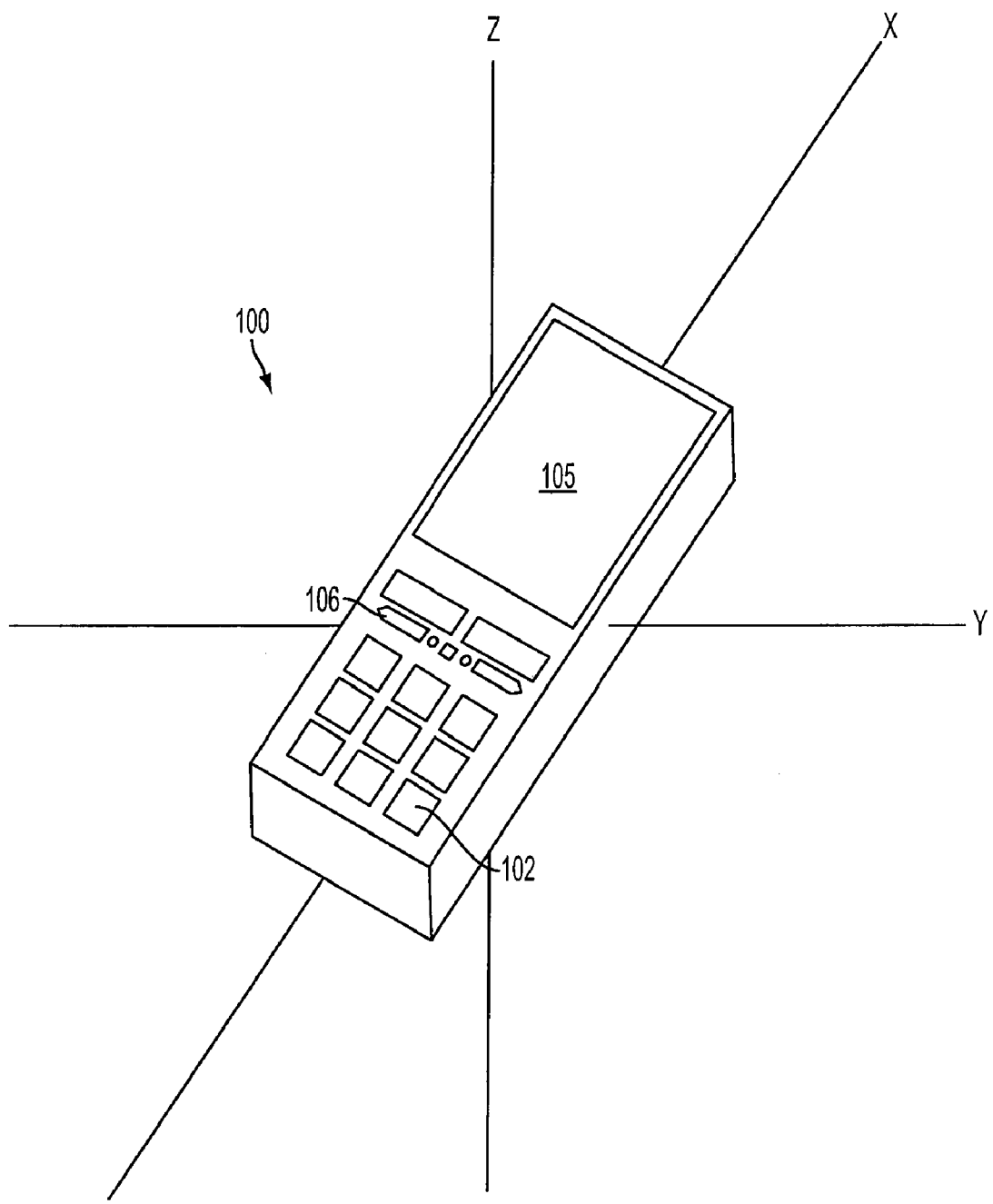
FIG. 1 depicts the exterior appearance of a device according to one exemplary implementation, in a state where the device is in the neutral position.

FIG. 1 depicts the exterior appearance of a device according to one exemplary implementation, in a state where the device is in the neutral position. The hardware environment of device 100 includes a keypad including at least a first control 102 for entering text data and user commands into the device 100, a display 105 for displaying text and images to a user, and an indicator, such as a tilt indicator 106, for displaying an indication of angular displacement or tilt orientation about at least one axis.

Display 105 displays the graphics, images, and text that comprise the user interface for the software applications used by this implementation, as well as the operating system programs necessary to operate the device 100. A user of device 100 uses first control 102 to enter commands and data to operate and control the operating system programs as well as the application programs.

Display 105 is configured to display the GUI to a user of device 100. A speaker may also be present also generate voice and sound data received from the application programs operating on device 100, such as a voice from another user generated by a telephone application program, or a ring tone generated from a ring tone application program. A microphone may also be used to capture sound data generated by the user, for example, when the user is speaking to another user during a telephone call via device 100. Furthermore, tilt indicator 106 is configured to indicate the angular displacement or tilt orientation of device 100, to provide visual feedback to the user of device 100 and to make the user aware of the tilt orientation that will be used to interpret a control selection.

The operation of device 100 is based upon its orientation in two states: the "neutral" position, and a "selection" position corresponding to the position of the device prior to, at the time of, or after the selection of first control 102. More specifically, and as described fully below, the output of an output signal by device 100 is dependent upon the angular displacement between the neutral position and the selection position, in relation to at least one axis, where the angular displacement has an angular displacement component for each axis of interest.

FIG. 1, for example, depicts device 100 in one contemplated three-axis neutral position In particular, orthogonal X, Y and Z-axes intersect at the center of device 100, where the X-axis extends parallel to the longitudinal direction of device 100. According to this exemplary neutral position, a rotation around the X-axis would effectuate a rolling motion, a rotation around the Y-axis would effectuate a pitching motion, and a rotation around the Z-axis would effectuate a yawing motion. These roll, pitch, and yaw motions are generically referred to herein as "tilt" motions.

The determination of the number of axes of interest, and the location and orientation of the axes with relation to device 100, is a device-specific and application-specific determination, and no limitation of any of these characteristics is inferred in the following description. For example, where it is undesirable or impossible to manipulate the device in a yawing motion, or where the number of output signals may be effectively controlled using motion about one or two axes, the neutral position of the device may be determined with regard to these one or two axes alone. Furthermore, the at least one axis may not intersect device 100, or the at least one axis may extend along a periphery or edge portion of device 100. Additionally, one of the axes may extend parallel along the longitudinal direction of device 100 or it may extend at an angle to the longitudinal direction of device 100. In any regard, the neutral position is aligned with an axis relative to the Earth, such as a magnetic or true North axis, or an axis pointing to the center of the Earth, or toward the horizon, with an axis relative to the user, the device, or other axis.

With regard to telephony, a one-axis neutral position is provided in the case where angular displacement is to be measured with regard to roll rotation around the X-axis, or a two-axis neutral position is provided in the case where angular displacement is to be measured with regard to roll and pitch rotation around the X-axis and Y-axis, respectively. In either case, the X-axis and Y-axis intersect at the center of the device, with the X-axis extending longitudinally parallel to the longitudinal direction of the device. Other neutral position orientations are contemplated as well.

When inputting characters into a device such as a telephone, the user typically holds the device at an positive (upwards) pitch angle while looking into the display. In that regard, the X-axis of the telephone in the neutral position may be defined at a similar upwards angle, such that flattening the angle of the telephone with regard to the ground would be registered as a pitched forward tilting motion. In other instances, of course, an X-axis which is parallel to the ground is the "neutral" X-axis position.

Although device 100 is illustrated in FIG. 1 as a mobile telephone, in further aspects device 100 may include a desktop PC, a laptop, a workstation, a midrange computer, a mainframe, a handheld or tablet computer, a personal data assistant ("PDA") or another type of embedded system such as a computer keyboard or a remote control.

Figure 2:
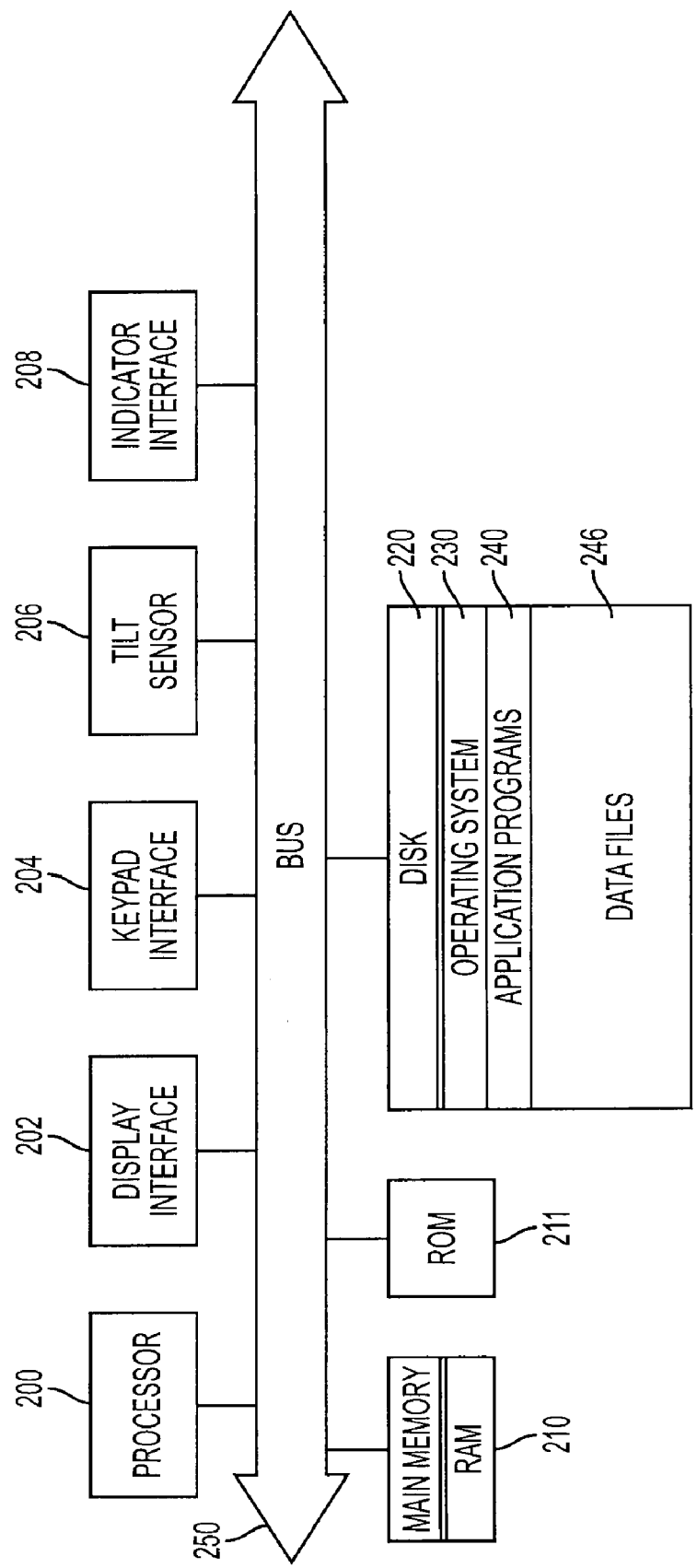
FIG. 2 depicts an example of an internal architecture of the implementation of FIG. 1.

FIG. 2 depicts an example of an internal architecture of the implementation of FIG. 1. The computing environment includes processor 200 where the computer instructions that comprise an operating system or an application are processed; display interface 202 which provides a communication interface and processing functions for rendering graphics, images, and texts on display 105; keypad interface 204 which provides a communication interface to the keypad, including first control 102; tilt sensor 206 for measuring angular displacement of device 100 about at least a first axis; indicator interface 208 which provides a communication interface to the indicators, including tilt indicator 106, random access memory ("RAM") 210 where computer instructions and data are stored in a volatile memory device for processing by processor 200; read-only memory ("ROM") 211 where invariant low-level systems code or data for basic system functions such as basic input and output ("I/O"), startup, or reception of keystrokes from the keypad are stored in a non-volatile memory device; and optionally a storage 220 or other suitable type of memory (e.g. such as random-access memory ("RAM"), read-only memory ("ROM"), programmable read-only memory ("PROM"), erasable programmable read-only memory ("EPROM"), electrically erasable programmable read-only memory ("EEPROM"), magnetic disks, optical disks, floppy disks, hard disks, removable cartridges, flash drives), where the files that comprise operating system 230, application programs 240 and data files 246 are stored. The constituent devices and processor 200 communicate with each other over bus 250.

RAM 210 interfaces with bus 250 so as to provide quick RAM storage to processor 200 during the execution of software programs such as the operating system application programs, and device drivers. More specifically, processor 200 loads computer-executable processes from memory media into a field of RAM 210 in order to execute software programs. Data is stored in RAM 210, where the data is accessed by processor 200 during execution.

Also shown in FIG. 2, storage 220 stores computer-executable code for an operating system 230, application programs 240 such as word processing, spreadsheet, presentation, graphics, image interpretation training, gaming, or other applications, and data files 246. Although it is possible to use the above-described implementation, it is also possible to implement the functions according to the present disclosure as a dynamic link library ("DLL"), or as a plug-in to other application programs such as an Internet web-browser such as the MICROSOFT® Internet Explorer web browser.

Processor 200 is one of a number of high-performance computer processors, including an INTEL® or AMD® processor, a POWERPC® processor, a MIPS® reduced instruction set computer ("RISC") processor, a SPARC® processor, a HP ALPHASERVER® processor, an ACORN® RISC Machine ("ARM®") architecture processor, or a proprietary computer processor for a computer or embedded system, without departing from the scope of the present disclosure. In an additional arrangement, processor 200 in device 100 is more than one processing unit, including a multiple CPU configuration found in high-performance workstations and servers, or a multiple scalable processing unit found in mainframes.

Operating system 230 may be MICROSOFT®WINDOWS NT®/WINDOWS® 2000/WINDOWS® XP Workstation; WINDOWS NT®/WINDOWS® 2000/WINDOWS® XP Server; a variety of UNIX®-flavored operating systems, including AIX® for IBM® workstations and servers, SUNOS® for SUN® workstations and servers, LINUX® for INTEL® CPU-based workstations and servers, HP UX WORKLOAD MANAGER® for HP® workstations and servers, IRIX® for SGI® workstations and servers, VAX/VMS for Digital Equipment Corporation computers, OPENVMS® for HP ALPHASER-VER®-based computers, MAC OS® X for POWERPC® based workstations and servers; SYMBIAN OS®, WINDOWS MOBILE® or WINDOWS CE®, PALM®, NOKIA® OS ("NOS"), OSE®, or EPOC® for mobile devices, or a proprietary operating system for computers or embedded systems. The application development platform or framework for operating system 230 may be: BINARY RUNTIME ENVIRONMENT FOR WIRELESS® ("BREW®"); Java Platform, Micro Edition ("Java ME") or Java 2 Platform, Micro Edition ("J2ME®"); PYTHON™, FLASH LITE®, or MICROSOFT®.NET Compact.

Tilt sensor 206 detects the orientation of device 100, as described below, and is a gyroscope, an optical sensor, and/or other type of tilt sensor. An optical sensor, for example, may be used to detect the orientation of device 100 using an optical flow of a sequence of images from a camera embedded in device 100 to determine the motion and orientation of device 100. Optical flow describes the apparent relative velocity of features within a sequence of images. Since optical flow is relative to the camera, motion of the camera will result in apparent velocities of features in the camera view. The motion of the camera is calculated from the apparent velocities of features in the camera view. Position or orientation are also calculated relative to the neutral position, over an extended span of time. Although tilt sensor 206 has been described as an optical sensor using an optical flow approach for tracking the tilt or inclination of device 100 using camera, in other aspects the tilt or inclination of device 100 is tracked without using the optical flow approach, such as by using an accelerometer.

Computer readable memory media stores information within device 100, and is volatile or non-volatile. Memory may be capable of providing mass storage for device 100. In various different implementations, the memory may be a floppy disk device, a hard disk device, an optical disk device, or a tape device. While FIGS. 1 and 2 illustrate one possible implementation of a computing system that executes program code, or program or process steps, other types of computers or devices may also be used as well.

Figure 3:
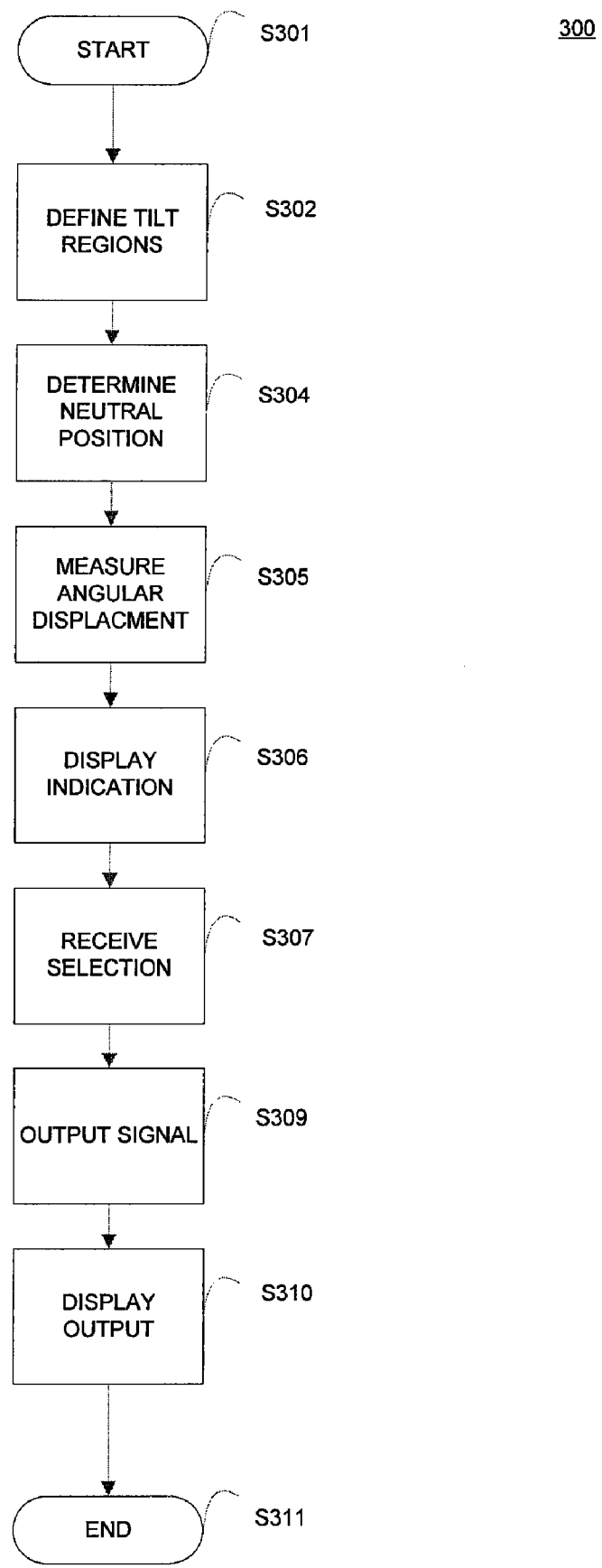
FIG. 3 is a flowchart illustrating a method in accordance with another exemplary implementation.

FIG. 3 is a flowchart illustrating a method in accordance with another exemplary implementation. Briefly, the method includes determining a neutral position of a device in relation to at least a first axis, the device including at least a first control associated with a first plurality of output signals, and measuring an angular displacement of the device about at least the first axis. The method also includes receiving a selection of the first control, and outputting one of the first plurality of output signals based at least upon the selection and the angular displacement.

In more detail, method 300 begins (step S301), and a plurality of tilt regions are defined about a first axis (step S302). As is described in more detail below, the output of an output signal is based at least upon the angular displacement of a device upon the selection of a first control. In accordance with one aspect, tilt 'regions' are defined such that, upon the selection of the control, if the angular displacement falls within a particular tilt region or band of angles, an output associated with the tilt region is output.

FIGS. 4A to 4D illustrates several example tilt regions with regard to a hypothetical neutral axis, labeled the "N-axis," where the neutral represents the neutral X, Y and/or Z-axis. Each of the X, Y, or Z-axis can have individually-determined tilt regions, a common tilt region definition can be applied to multiple axes, or axes can have no defined tilt regions.

Figure 4A:
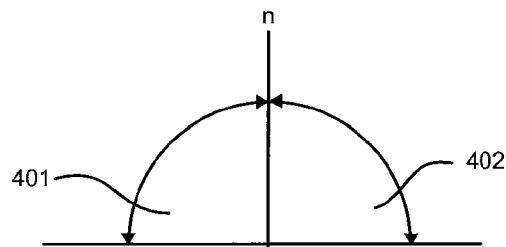
FIGS. 4A to 4D depict examples of tilt regions that are defined about a neutral axis.

FIG. 4A illustrates an example of two tilt regions defined about the neutral axis. An angular displacement from approximately −90° to 0° about the neutral axis is within region 401, and an angular displacement from approximately 0° to approximately 90° about the neutral example is within region 402. An angular displacement from approximately 91° to −91°, indicative of a device that is upside down, does not correspond to any region, and an angular displacement of exactly 0° is in either region 401 or 402.

Where the neutral axis represents the X-axis, an angular displacement in region 401 would result from a negative roll of the device (to the left), and an angular displacement in region 402 would result from a positive roll of the device (to the right). Where the neutral axis represents the Y-axis, an angular displacement in region 401 would result from a negative pitch (forward) the device, and an angular displacement in region 402 would result from a positive pitch (rearward) of the device. Where the neutral axis represents the Z-axis, an angular displacement in region 401 would result from a negative yaw (counterclockwise), and an angular displacement in region 402 would result from a positive yaw (clockwise). Although two tilt regions are depicted, any number of tilt regions may be defined, depending largely upon the sensitivity of the tilt sensor, the number of output signals associated with each control and the ability of the user to discriminate between small angles when manipulating the device.

In any case, the signal output by the device is dependant upon the angular displacement and the tilt region. For example, the device outputs a first of a plurality of signals if the angular displacement of the device is within a first region, and a second of a plurality of signals if the angular displacement of the device is within a second region, even if the same control is selected in both circumstances. Although FIG. 1 illustrates regions 401 and 402 as encompassing ±90° bands, in a similar aspect tilt region 401 defines a region encompassing approximately −30° to 0° about the neutral axis, and the tilt region 402 defines a region encompassing approximately 0° to +30° about the neutral axis.

Figure 4B:
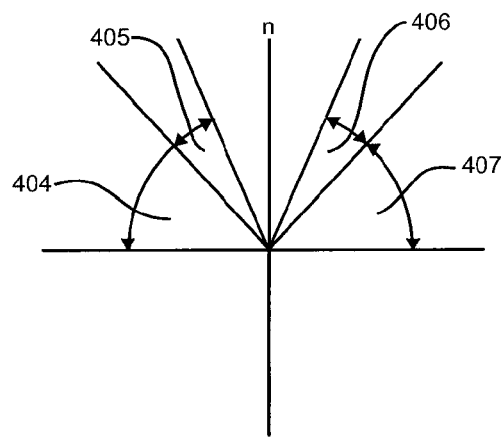

FIG. 4B illustrates an example of four tilt regions defined about the neutral axis, with a dead space between regions at 0° about the neutral axis. Due to the insensitivity of a tilt sensor, the inability of a user to discriminate, or for other reasons, it is often desirable define a dead space between two otherwise-adjacent regions. Where the neutral axis represents the Y-axis, an angular displacement of between approximately 91° to −91°, indicative of a device which is upside down, or an angular displacement of approximately 0° does not correspond to any tilt region. If a control is selected when the device is not oriented in a tilt region, a default output is output, the last output is output, no output is output, an output associated with the closest tilt region or a complementary tilt region is output, or another type of output is output.

An angular displacement in region 404 would result from a hard negative pitch of the device, although an angular displacement in region 405 would also result from a negative pitch which is lesser in magnitude than a region 404 negative pitch. An angular displacement in region 407 would result from a hard positive pitch of the device, although an angular displacement in region 406 would also result from a positive pitch which is lesser in magnitude than a region 407 negative pitch.

Figure 4C:
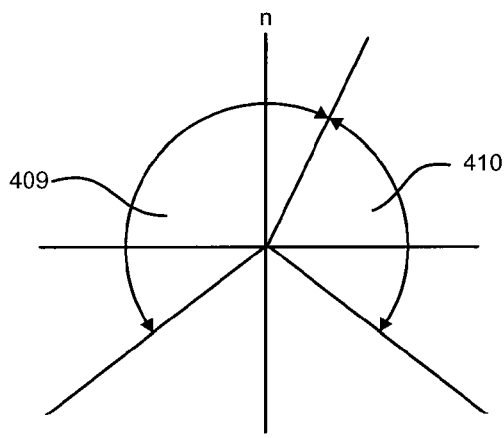

FIG. 4C illustrates an example of two tilt regions defined about the neutral axis, where the area around 0° about the neutral axis is substantially within a first region. In particular, where the neutral axis represents the X-axis, the device would remain in region 409 if negatively rolled, if unmoved from the neutral position, or if modestly rolled in the positive direction. In order for the device to be oriented in region 410, a hard positive roll would have to occur. The tilt regions depicted in FIG. 4C would be desirable, for instance, where region 409 represents a default desired output, and where an affirmative, high magnitude manipulation of the device would be necessary to place the device in region 410, thus overriding the default desired output. In the FIG. 4C example, tilt region 409 encompasses an angular displacement of 0°, where the angular displacement of the device is in tilt region 409 if the angular displacement about the first axis is measured as 0°.

Figure 4D:
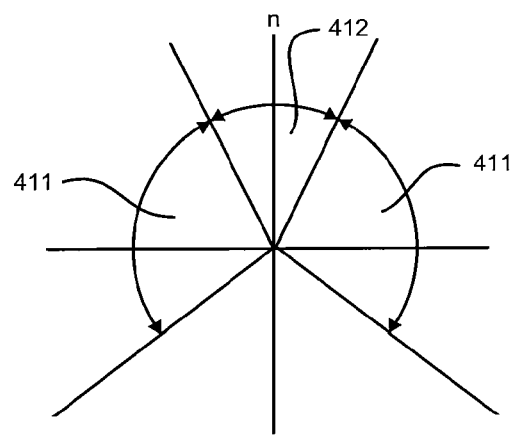

FIG. 4D illustrates an example of two tilt regions defined about the neutral axis, where a single region occupies angular displacement bands on both sides of the neutral axis. More particularly, region 412 is defined by the area surrounding 0° about the neutral axis, and region 411 occupies symmetrical angular bands in the positive and negative angular directions. Where the neutral axis represents the Z-axis, an angular displacement in region 411 would result from a high-magnitude positive or negative yaw. An angular displacement in region 412 would result from a more modest positive or negative yaw, or from the orientation of the device remaining in the neutral position.

In any of the above described examples, the neutral axis may represent the X, Y, and/or Z-axis, thus effectively multiplying the total number of available tilt regions. For example, if the neutral axis in the FIG. 4A example represents the X-axis, and the neutral axis in the FIG. 4B example represents the Y-axis, a total of eight tilt regions would be available, since the four pitch tilt regions of FIG. 4B would each be divided into the two roll tilt regions of the FIG. 4A example. Assuming that each axis has an equal number n tilt regions, the total number of tilt regions for a two-axis arrangement is $n^2$ and the total number of tilt regions for a three-axis arrangement is $n^3$.

Finally, it is contemplated that in some instances the angular displacement itself, and not the tilt region, will be determinative of the output signal, and thus would be unnecessary to define tilt regions. Furthermore, tilt regions are also defined implicitly in the case where the range of motion about a desired axis is divided equally by the number of output signals, where each output signal corresponds to a mathematically-determined range of angles.

Returning to FIG. 3, the neutral position of a device is determined in relation to at least a first axis, the device including at least a first control associated with a first plurality of output signals (step S304).

Figure 5:
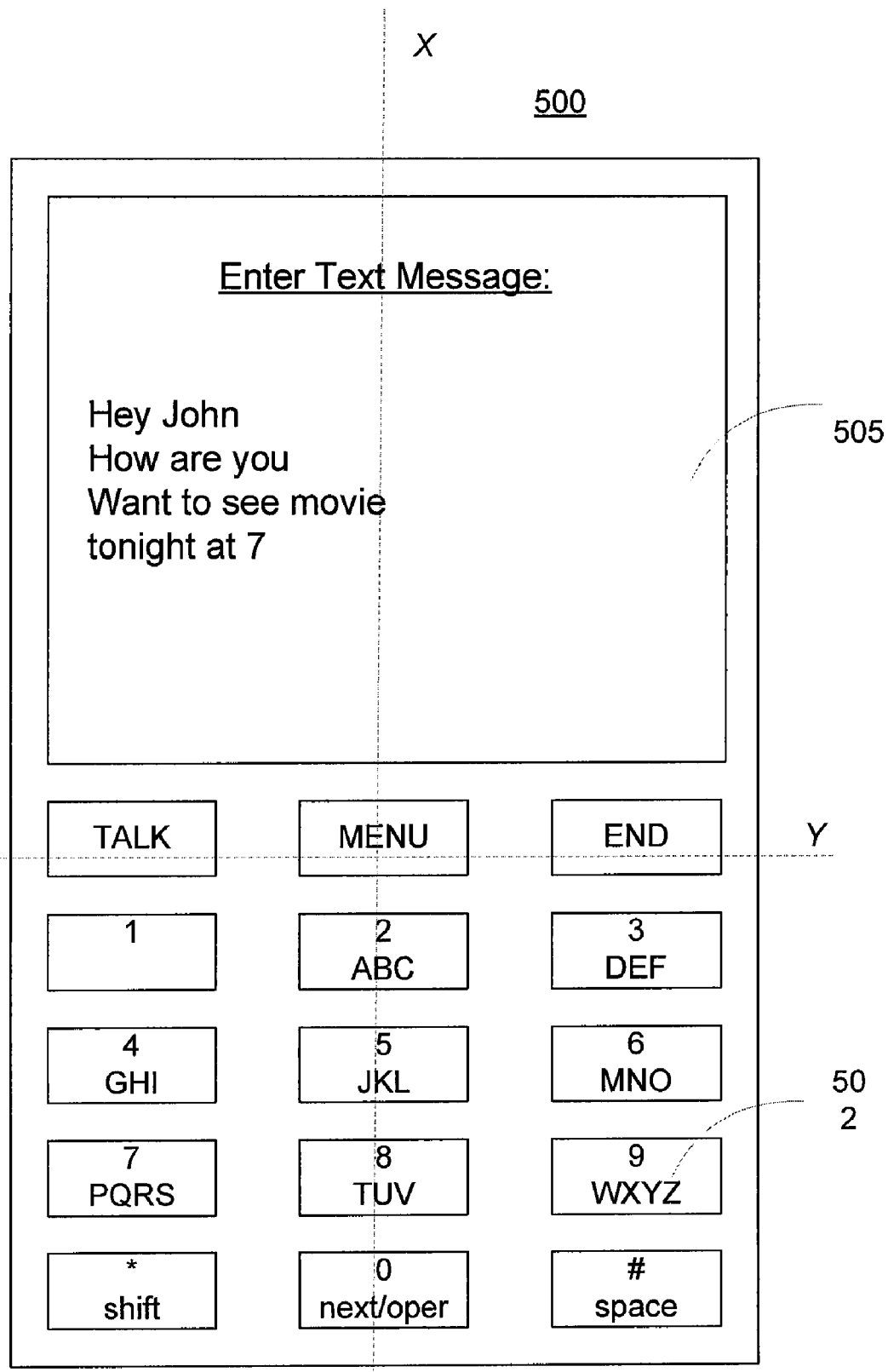
FIG. 5 illustrates a top exterior view of an example device according to another exemplary implementation.

FIG. 5 illustrates a top exterior view of an example device according to another exemplary implementation. Device 500, a mobile telephone, has a keypad including at least first control 502 associated with a first plurality of output signals. In the illustrated example, first control 502 is a key, or button, on the keypad or keyboard of device 500, where each individual control represents a multiple of alphanumeric characters or symbols. Specifically, first control 502 is labeled "9", and corresponds to four output signals indicative of the characters "W", "X", "Y", and "Z", or twelve output signals indicative of the case-sensitive characters "W", "X","Y", "Z", "w", "x""y", "z", and the symbols ",", ".", "/", and "". There is no limit for the number of output signals or characters that can correspond to a single control. In particular aspects, first control 502 is associated with a plurality of output signals, such as three output signals, or nine output signals. Each of the plurality of output signals may correspond to a character, such as an alphanumeric character or a symbol.

The neutral position of device 500 is determined, for example, when device 500 is powered on, prior to or after a selection of the first control, or at the site of manufacture. In one aspect, a memory buffer stores output data of the tilt sensor, and the neutral position of device 500 is reconstructed from the orientation of device 500 when a control is selected and the output data. In another aspect, the neutral position is a factory pre-set condition, such as the case where the neutral X-axis is defined as extending perpendicular to the center of the Earth, such that an angular displacement is measured if device 500 faces any direction other than up. In a further aspect, a processor, a tilt sensor, and the memory communicate to determine a common neutral position based upon the average position of device 500 whenever the control is ordinarily selected. Moreover, in an additional aspect, the neutral position is user-selectable. In any regard, the neutral position operates effectively to reset the tilt sensor to 0° across each axis of interest, where any motion of device 500 away from the neutral position serves to register an angular displacement. In relation to the user of device 500 or the Earth, the neutral position is a flat position, a vertical upright position, or a canted or tilted position.

In an additional aspect, the neutral position of device 500 is determined in relation to at least a second axis, orthogonal to the first axis, where the angular displacement includes a first-axis component and a second-axis component. In a further aspect, the neutral position of device 500 is determined in relation to at least a third axis orthogonal to the first axis and the second axis, where the angular displacement includes a third-axis component. The first axis, the second axis, and/or the third axis intersect within the device 500, outside of device 500, or along a peripheral portion or edge of device 500.

Since device 500 includes a tilt sensor that detects the orientation of the device, entry of text into the device is facilitated. For example, the tilt sensor detects a degree to which the device has been rolled to the left, to the right, or pitched up or down, where the tilt orientation or angular displacement of the device about the axes of interest indicates how selection of control 502 is interpreted and output. For example, if control 502 corresponds to multiple characters, the orientation of device 502 identifies which of the multiple characters is output when control 502 is selected, or identify a case in which the appropriate character is output.

Using the orientation of the device to identify a character to be output enables a character to be output each time a single control is selected, increasing the speed of text entry by reducing the number of control selections required to enter text. Because a fixed number of controls selections represents entry of a character, a user may specify a subsequent character immediately after a current character has been specified, eliminating the need to wait for a predetermined amount of time before specifying the subsequent character, also increasing the speed of text entry.

As indicated above, the neutral position of the device is a reference orientation from which an angular displacement is measured about at least one axis, to the selection position, the selection position corresponding to the position of the device prior to, at the time of, or after the selection of a control such as the first control. In one aspect, the neutral position of the device is determined in relation to one axis, and the neutral position is determined as a "flat" position, where the one axis is parallel to the ground. In another aspect, the neutral position of the device is determined in relation to two axis, and the neutral position is ergonomically determined as the orientation of a device as it would commonly be held by a user of the device. In a further aspect, the neutral position of the device is determined in relation to three axis, where one axis is determined as parallel to a magnetic North-South axis, one axis is determined as parallel to an East-West axis, and the third axis is determined as facing towards and away from the center of the Earth.

Returning to FIG. 3, an angular displacement of the device is measured about at least the first axis (step S305). In particular, a tilt sensor, such as tilt sensor 206, measures the angular displacement between the current position of the device and the neutral position, where the angular displacement includes a component for each axis of interest. In one aspect, the tilt sensor 206 measures the angular displacement of the device at the moment the control is selected. Since the selection of the control itself may affect the orientation of the device, in another aspect the tilt sensor measures the angular displacement of the device a time before or after the control is selected.

The tilt sensor detects the orientation of the device. For example, the tilt sensor detects a degree to which the device has been rolled to the left or right, pitched up or down, or yawed clockwise or counterclockwise. In one aspect, the tilt sensor measures at least two discrete levels of roll tilt about the X-axis, in which case the device may be said to be rolled left, rolled right, or not rolled left or right. In addition, the tilt sensor measures at least two discrete levels of pitch tilt about the Y-axis in the forward or backward direction, in which case the device may be said to be pitched up, pitched down, or not pitched up or down. Further, the tilt sensor measures at least two discrete levels of yaw tilt about the Z-axis, in which case the device may be said to be yawed clockwise, yawed counterclockwise, or not yawed. In such an implementation, the tilt sensor indicates that the device has been rolled to the left when the device has been rolled between 15° and 45° to the left. As another example, the tilt sensor indicates that the device has not been pitched forward or backwards when the device has been pitched less than 15° forward and less than 15° backward. In another implementation, the tilt sensor may indicate more than three levels of tilt in each of the left-to-right and forward or backwards directions. In such an implementation, each of the levels of tilt in a particular direction corresponds to a range of degrees in which the device has been tilted.

An indication of the angular displacement is displayed (step S306). As described above, it is possible that the orientation of the neutral position may not be instinctive to a user. Furthermore, each axis may have two or more tilt regions in each direction about each axis. For these and other reasons, an indicator is provided to display either an indication of the angular displacement, or an indication of the tilt region to which the angular displacement corresponds, in real-time or near real-time. If the angular displacement is measured at a time before or after the control is selected, the indicator estimates the appropriate angular displacement or indication of the tilt region at the time based upon all available information. If the neutral position is defined in relation to more than one axis, the user can determine which axis the indicator is indicating, the indicator can have a default or preset axis of interest, or the determination may be context sensitive.

Figure 6A:
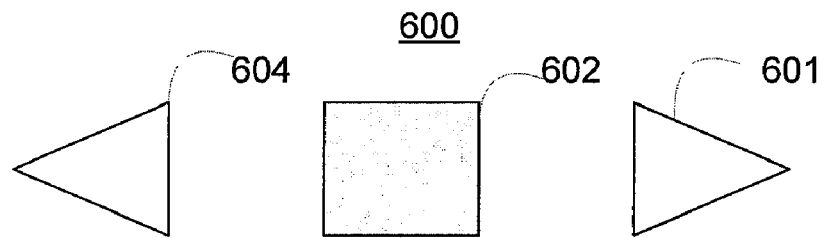
FIGS. 6A to 6E illustrate example indicators according to one exemplary aspect.
Figure 6B:
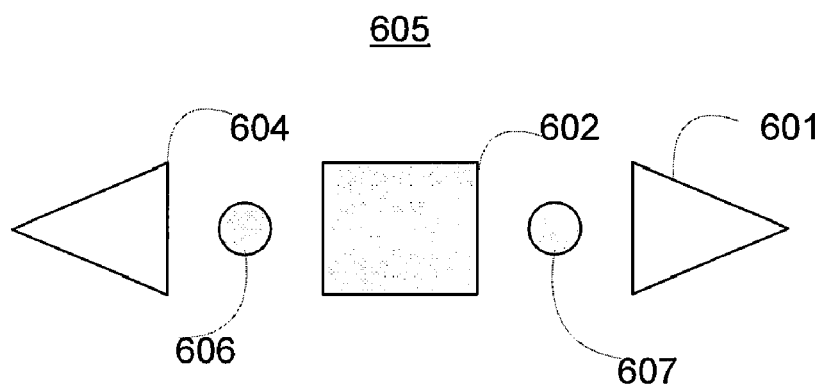

FIGS. 6A to 6B illustrate example indicators according to one exemplary aspect. In FIG. 6A, indicator 600 indicates the orientation of the device on a display. The indicator provides visual feedback so that the user is aware of the orientation of the device that will be used to interpret a control selection.

Indicator 600 includes positive tilt indicator 601 and negative tilt indicator 604, that point in the negative (left) and positive (right) directions, respectively. In addition, indicator 600 includes center indicator 602 that is visually distinguished from positive tilt indicator 601 and negative tilt indicator 604 when the device is not tilted, such as when the device is in the neutral position or in a position that is unregistered by the tilt sensor, such as upside down. One of the tilt indicators is illuminated or otherwise visually distinguished from the other tilt indicator and center indicator 602 when the device is tilted in the indicated direction. Furthermore, center indicator 602 is illuminated or otherwise visually distinguished from positive tilt indicator 601 and negative tilt indicator 604 when the device is not rolled to the left of the right. The center indicator, for example would be illuminated when the device is oriented as illustrated in FIG. 1. Positive tilt indicator 601 would be illuminated when the device is oriented as illustrated in region 402 of FIG. 4A, and negative tilt indicator 604 would be illuminated when the device is oriented as illustrated in region 401 of FIG. 4A.

Figure 6C:
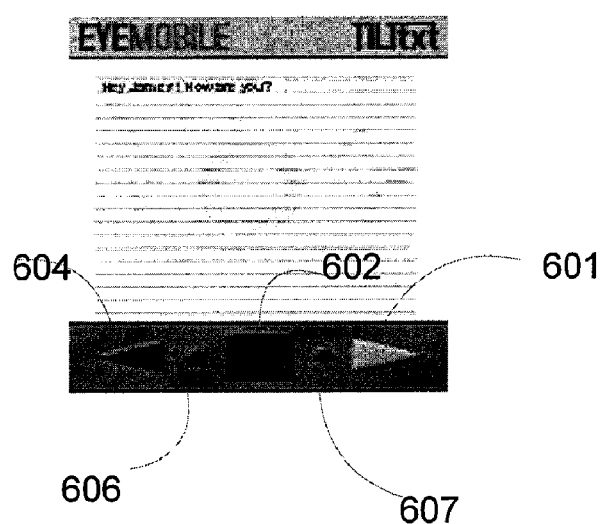

In another implementation illustrated in FIGS. 6B and 6C, indicator 605 also includes two partial tilt indicators 606 and 607 that also point in the negative and positive directions, respectively. Each of the partial tilt indicators is located between center indicator 604 and either negative tilt indicator 604 or positive tilt indicator 601. The partial tilt indicators are illuminated or otherwise visually distinguished from the other components of indicator 605 when the device is tilted partially in a indicated direction. In one implementation, both the partial tilt indicator and the center indicator are illuminated when the device is partially tilted partially in the corresponding direction. For example, negative tilt indicator 604 would be illuminated when the device is oriented in tilt region 404 of FIG. 4B, negative partial tilt indicator 606 and center indicator 602 would be illuminated when the device is oriented in tilt region 405 of FIG. 4B, center indicator 602 would be illuminated when the device is oriented in the neutral position, as illustrated in FIG. 1, positive partial tilt indicator 607 and center indicator 602 would be illuminated when the device is oriented in tilt region 406 of FIG. 4B, and positive tilt indicator 601 would be illuminated when the device is oriented in tilt region 407 of FIG. 4B. Any number of tilt indicators or partial tilt indicators are contemplated for each axis. For an axis having several dozen associated tilt regions, for example, the same number, more or fewer tilt indicators may be used to provide visual feedback.

Figure 6D:
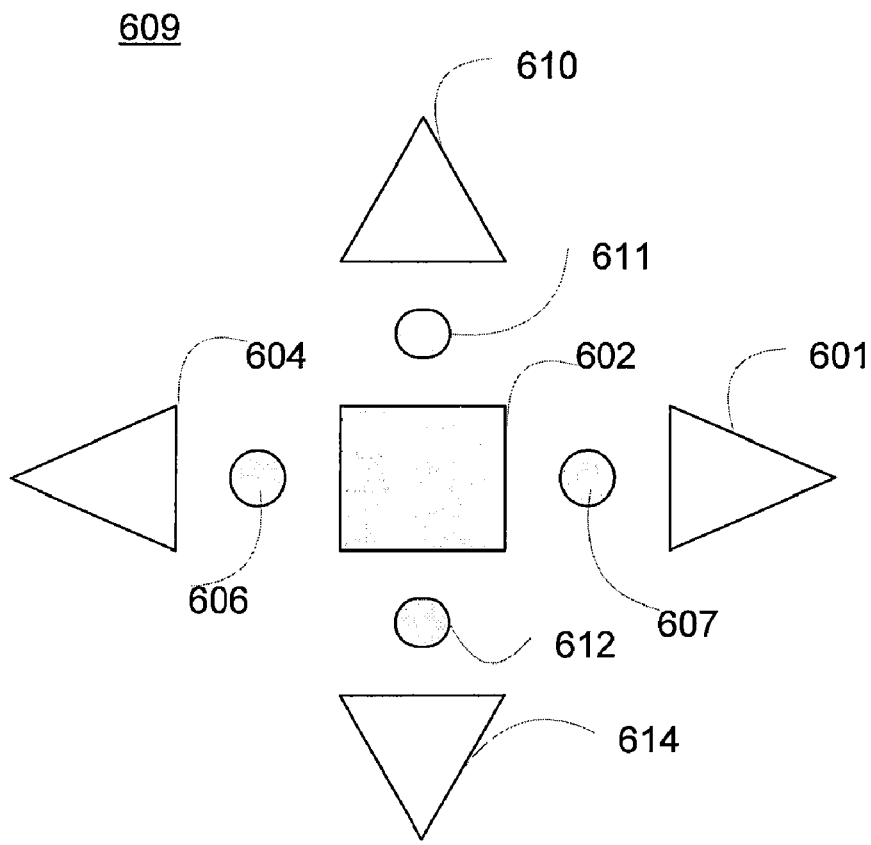
Figure 6E:
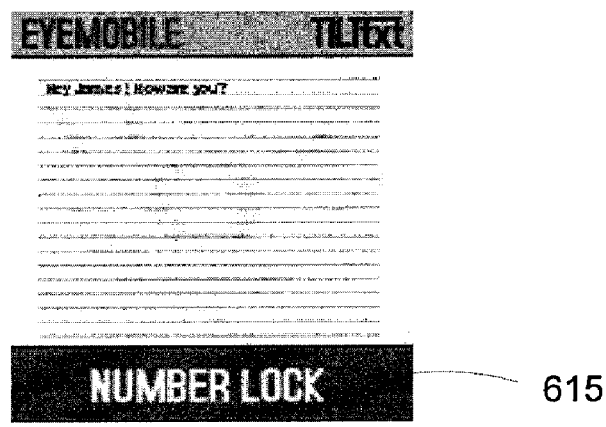
Figure 7A:
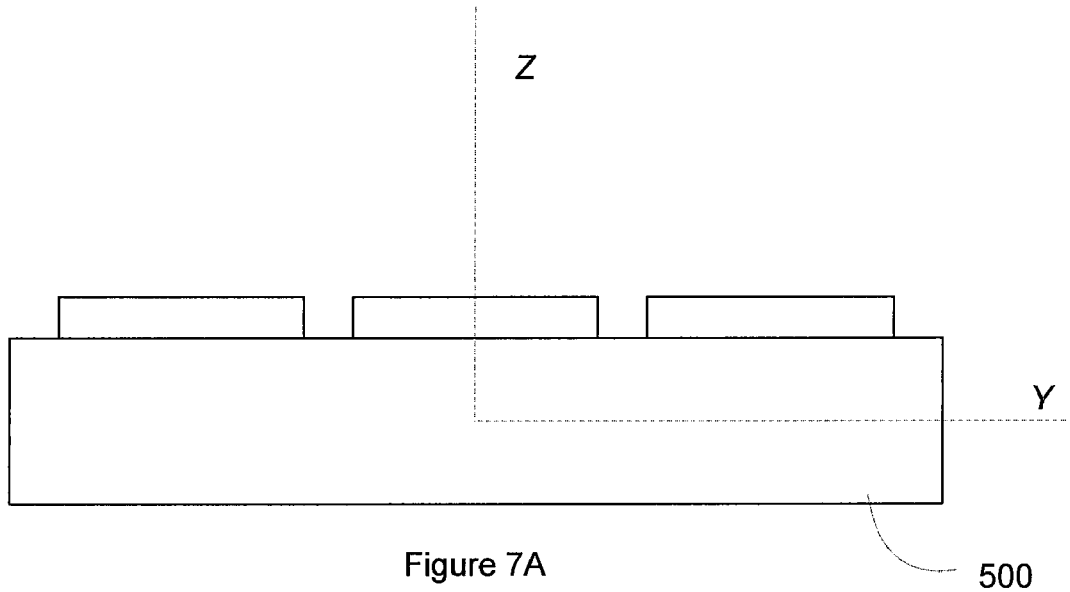
FIGS. 7A and 7B illustrate front and side views, respectively, of the device of FIG. 5, shown in the neutral position.
Figure 7B:
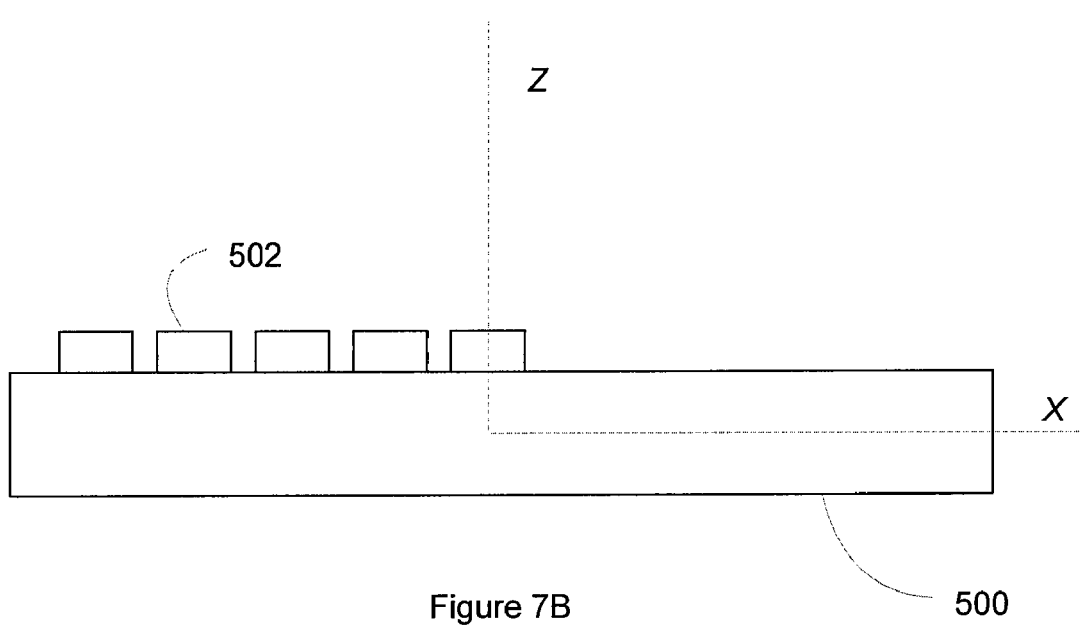

FIG. 6D illustrates a two-axis tilt indicator which may be presented on the display. Although the axes discussed in conjunction with FIG. 6D are referred to as the pitch (forward and backward) and roll (left and right) axes, these designations are arbitrary, and one set of indicators could also be the yaw axis, or another axis. Indicator 609 operates similarly to indicator 605 with regard to one axis, however, indicator 609 also integrates a pitch tilt indicator comprising negative pitch indicator 610, partial negative pitch indicator 611, partial positive pitch indicator 612, and positive pitch indicator 614, to the previously described one-axis indicator 605, which was described as a roll indicator. In another aspect illustrated in FIG. 6E, the indicator includes a single feature 615 that indicates the significance of the orientation of the device. For example, the single feature indicator indicates whether or not numbers may be output because of the measurement of the angular displacement of the device.

Although the indicator is depicted in FIGS. 1 and 6 as a series of arrows or intuitive lights, in one aspect the indicator is incorporated into the display, such as display 105, or the indicator is a speaker which plays sounds or sound files which describe the tilt of the device to the user via audio. Furthermore, in another aspect, no indication of angular displacement or tilt region is displayed or otherwise generated.

Returning to FIG. 3, a selection of the first control is received (step S307). In one aspect, the control is a keypad button, and selection occurs when the user depresses the button, thereby enabling a signal to be generated and transmitted to the processor indicating that a selection of the keypad button has occurred. In another aspect, the control is not a physical control, but rather an icon on a touch-sensitive screen. In this aspect, selection occurs when the user touches an area of the touch-sensitive screen associated with the icon, where a touch-sensitive screen application reads the coordinates of the touch, correlates the coordinates with the location of the icon, and transmits a signal indicating that the control has been selected. Other types of control selections are also contemplated.

According to the FIG. 5 implementation, device 500 includes a keypad, or grouping of controls, which enables the user to enter text in order to interact with the GUI presented on display 505. Each control corresponds to multiple output signals, each output signal associated with a characters. In one aspect, the keypad includes eight controls, labeled "2" to "9", that each correspond to multiple letters and a number. For example, the control labeled "2" corresponds to the letters "A," "B," and "C," and the number "2." In addition, other controls included in the keypad perform other text entry functions. For example, the control labeled "*" is used to change the case of a next character that is output. The control labeled "0" is used to advance to a subsequent character after a current character has been specified, and the control labeled "#" is used to insert a "space" character.

One of the first plurality of output signals is output based at least upon the selection and the angular displacement (step S309), or at least upon the selection, the angular displacement, and the plurality of tilt regions. Since the first control is associated with a first plurality of output signals, the angular displacement, or the angular displacement and the plurality of tilt regions are used to determine which one of the first plurality of output signals are output. In one aspect, the neutral position of the device is determined in relation to one axis, where three tilt regions are defined around that one axis, and where the first control is associated with three tilt regions. In this case, if the angular displacement is in the first tilt region, the first output signal is output, if the angular displacement is in the second tilt region, the second output signal is output, and if the angular displacement is in the third tilt region, the third output signal is output. In an alternative aspect, the output signal is output based upon the angular displacement and the number of output signals associated with the first control, based upon a formula or an algorithm.

Figure 8A:
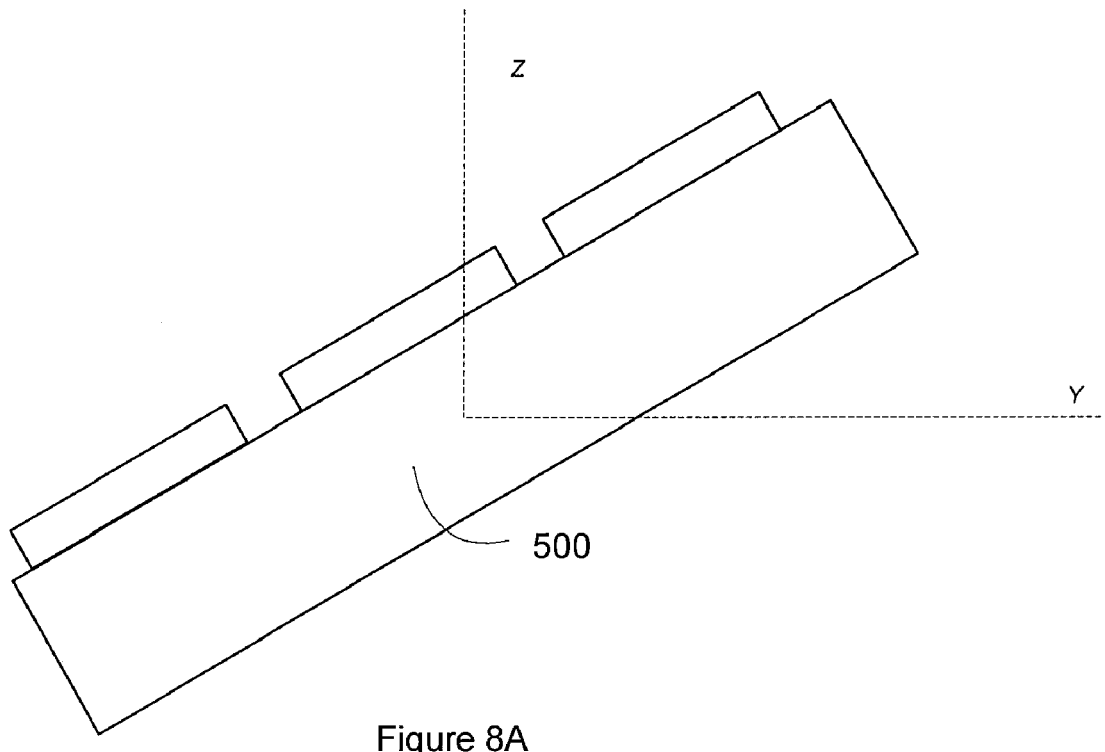
FIGS. 8A and 8B illustrate front views of the device of FIG. 5, shown in a state where the FIG. 5 device is manipulated in a negative roll orientation and a positive roll orientation, respectively.
Figure 8B:
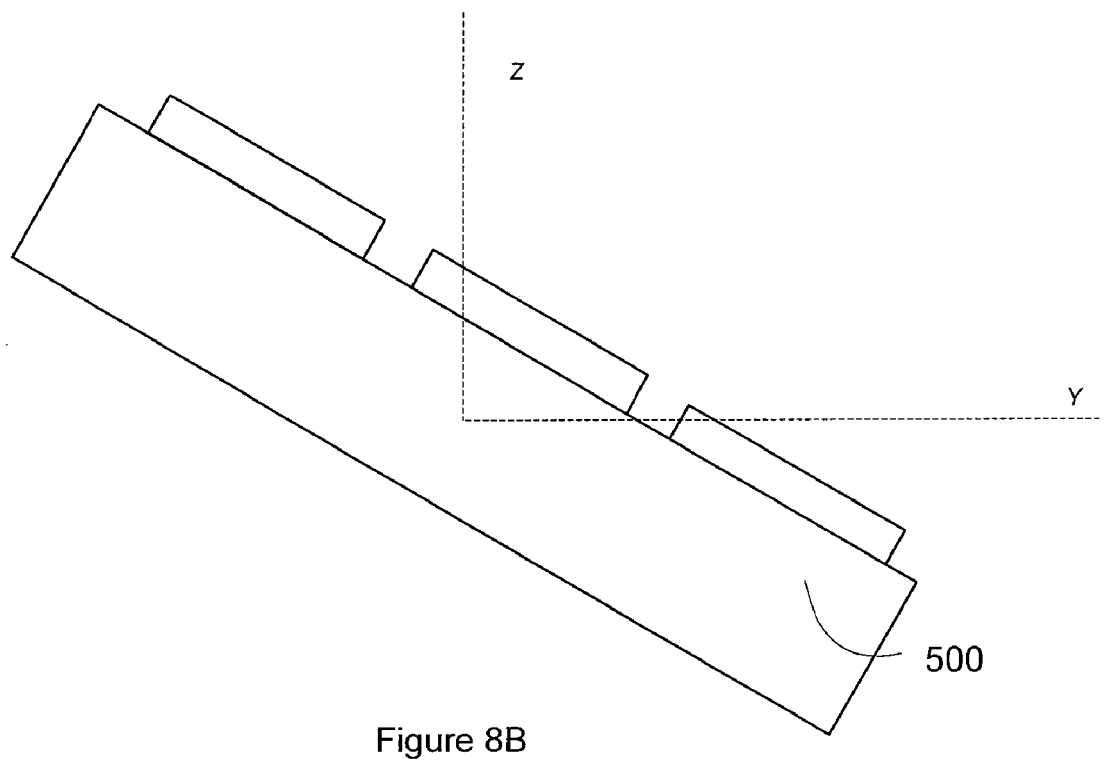
Figure 9A:
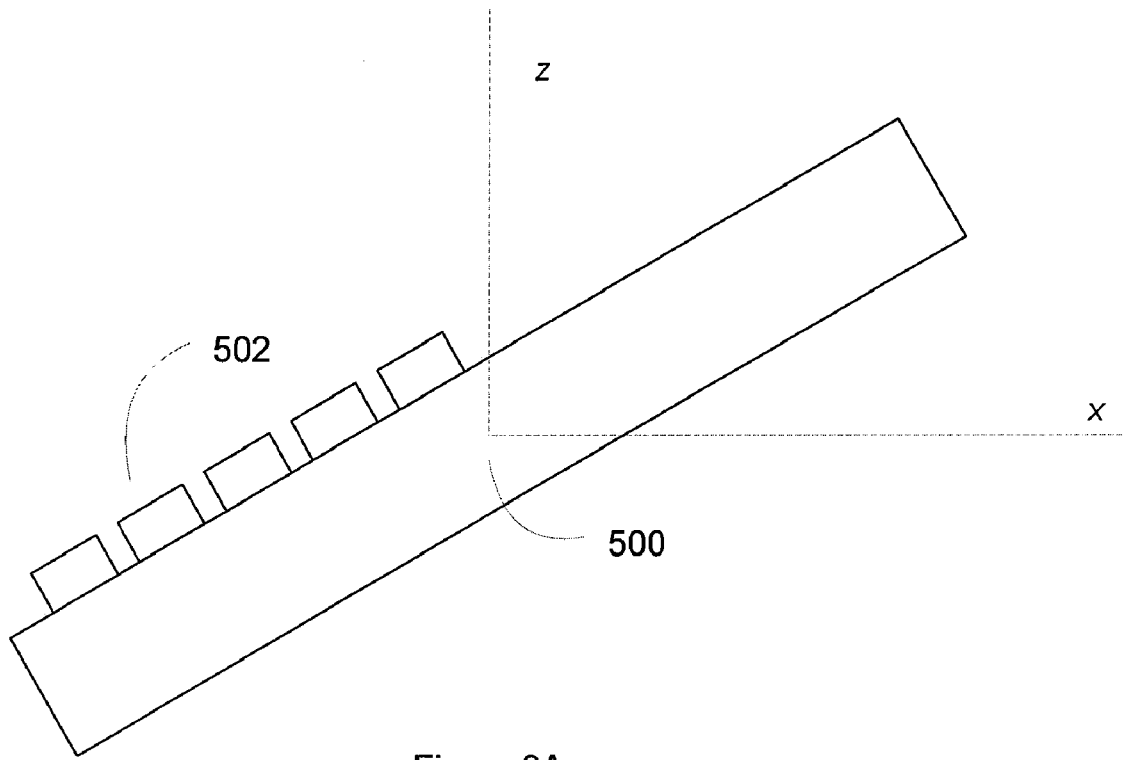
FIGS. 9A and 9B illustrate side views of the device of FIG. 5, shown in a state where the FIG. 5 device is manipulated in a positive pitch orientation and a negative pitch orientation, respectively.
Figure 9B:
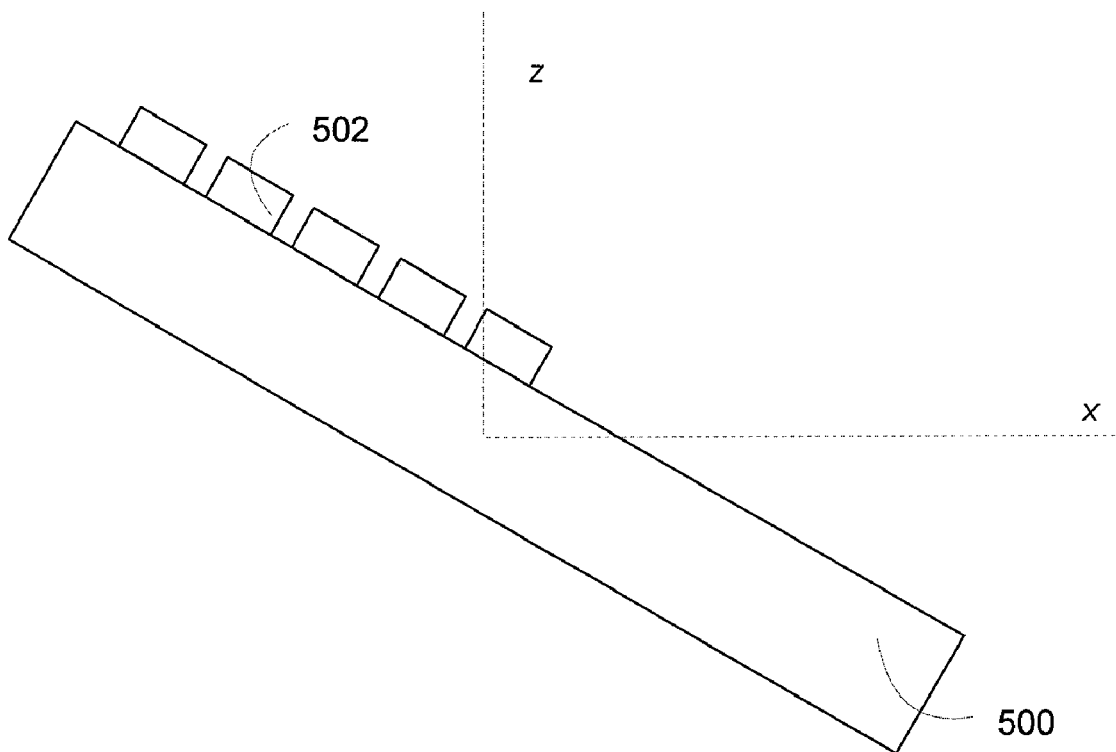

FIGS. 7 to 10 depict front and side views of the FIG. 5 device in different states of manipulation. In particular, FIGS. 7A and 7B illustrate front and side views, respectively, of device 500 in the neutral position. FIG. 8A illustrates a front view of the device manipulated in a negative roll about the X-axis and FIG. 8B illustrates a front view of the device manipulated in a positive roll about the X-axis. Similarly, FIG. 9A illustrates a side view of the device manipulated in a positive pitch about the Y-axis and FIG. 9B illustrates a side view of the device manipulated in a negative pitch about the Y-axis. In FIGS. 8 and 9, the device has been tilted approximately ±30° about the respective axes from the neutral position, shown in FIG. 7.

The orientation of the device, as indicated by the angular displacement measured by the tilt sensor, when a control of the keypad is selected affects the output signal output by the device, affecting, for example, the character generated by the control selection. Each of the multiple characters or output signals represented by a single control of a keypad correspond to a different orientation of the device. When one of the controls of the keypad is selected, the device identifies the plurality of characters that correspond to the selected control and the orientation of the device indicated by the tilt sensor. One of the multiple characters and a case for the character are identified based on the identified orientation, and the identified character is output.

The degree to which the device has been rolled to the left or right when a control is selected affects which one of the multiple characters represented by the control is output. In one implementation, the controls that represent multiple characters represent three letters, and the letters represented by the control are listed from left to right on the control. The device is configured to indicate that the device is rolled left, rolled right, or not rolled left or right. In one such implementation, rolling the device to the left when the control is selected indicates that the leftmost listed character should be output. Similarly, rolling the device to the right when the control is selected indicates that the rightmost listed character should be output. Finally, keeping the device oriented in the neutral position when the control is selected indicates that the center character should be output.

In another implementation, rolling the device to the left when the control is selected indicates that the rightmost listed character should be output, rolling the device to the right when the control is selected indicates that the leftmost listed character should be output, and keeping the device oriented in the neutral position when the control is selected indicates that the center character should be output. Such an implementation may be used, for example, because rolling the device to the left causes the rightmost listed character to appear above and more prominently than the other listed characters, and rolling the device to the right causes the leftmost listed character to appear above and more prominently than the other listed characters.

In other implementations, the controls of the keypad represent more than three characters, such as three letters and a number, or four letters and a number. For example, the control on a conventional telephone labeled "7" corresponds to the letters "P," "Q," "R," and "S," and the number "7." In such a case, the tilt sensor is configured to identify more than three discrete left-to-right roll positions such that one of the more than three characters represented by a selected control may be identified based only on the roll orientation of the device. Each of the discrete roll positions correspond to one of the characters represented by the selected control. For example, if the selected control is the key labeled "7", the device being rolled as illustrated in region 404 of FIG. 4B would indicate that the letter "P" should be output, the device being rolled as illustrated in region 405 of FIG. 4B would indicate that the letter "Q" should be output, the device being rolled as illustrated in region 406 of FIG. 4B would indicate that the letter "R" should be output, the device being rolled as illustrated in region 407 of FIG. 4B would indicate that the letter "S" should be output, and the device being oriented in the neutral position, as illustrated in FIG. 1, would indicate that the number "7" should be output.

While the roll orientation of the device is used to identify a character to be output, the pitch orientation of the device is used to identify a case for the character. In one implementation, the device being pitched (or tilted) forward when a control is selected causes a character that is identified by the roll (left-to-right tilt) orientation of the device to be output in upper case. Similarly, the device not being pitched forward or backward (in a neutral pitch position) when a control is selected causes a character that is identified by the roll (left-to-right tilt) orientation of the device to be output in lower case.

In some implementations, the device being pitched (or tilted) backward may cause a symbol to be output. The symbol may be a symbol corresponding to the number represented by the selected control on a conventional computer keyboard. For example, if the control that represents the number "1" is selected while the device is pitched backward, the symbol "!" may be output, because the symbol "!" corresponds to the number "1" on a conventional computer keyboard (e.g., pressing "Shift" and "1" on a computer keyboard outputs the character "!").

The tilt sensor is capable of detect more tilt positions in the pitch direction than is necessary to indicate the case of the character to be output. As such, the pitch positions that are not used to indicate the case of the character may be used to select the character. For example, a control may represent three letters and a number, and three roll positions may be used to select among the three letters. Two pitch positions may select the case for letters, and a third pitch tilt position may select the number represented by the key.

Furthermore, the tilt sensor independently indicates whether the device has been rolled left, neutral, or right or whether the device has pitched forward, neutral, or backwards, thereby allowing the tilt sensor to indicate whether the device is in one of nine orientations. Each of the nine orientations may correspond to a character and a case for the character.

FIG. 10 is a table showing one possible mapping of device orientations to output signals corresponding to characters and cases that may be output when the control labeled "2" on the keypad is selected. In the illustrated mapping, the device being rolled left and pitched forward causes the capital letter "A" to be output, the device not being rolled or pitched in either direction case the lower case letter "b" to be output, and the device being pitched backwards causes the number "2" to be output. In other implementations in which the tilt sensor may identify more than three roll positions or more than three pitch positions, more orientations that may be mapped to characters and cases are available.

Output signals corresponding to characters are described as being selected based on a first axis angular displacement or tilt position of the device, and output signals corresponding to upper or lower cases for the characters are described throughout as being selected based on a second axis angular displacement or position of the device. In other implementations, the angular displacement in different axes may effectuate the output of signals corresponding to characters or upper and lower cases of characters. In general, any orientation of the device may be mapped to any character and case for the character, regardless of which of the axes was used to select the character or the case.

Figures 11A, 11B:
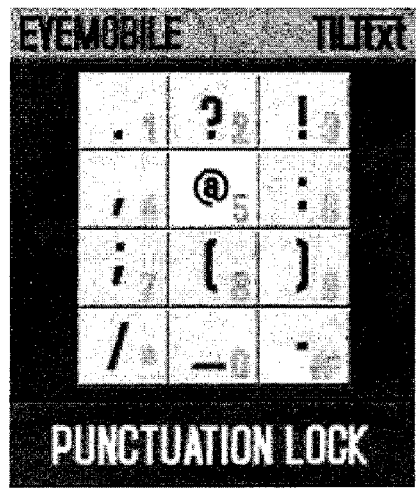
FIGS. 11A and 11B illustrate a menu of symbols that is displayed in accordance with another exemplary implementation.

In addition to outputting a signal corresponding to a character that is output in response to selection of a control, the orientation of the device may be used to indicate a menu option that is to be selected. For example, selection of a control that does not correspond to any characters, such as the "1" key on a telephone, causes a menu to be presented on the display of the telephone, where each option of the menu correspond to a different orientation of the telephone. The orientation of the device when a control indicating that a selection from the menu should be made (e.g., an "OK" key, an "Enter" key, or the "1" key) is selected may indicate which of the menu options is selected. In one aspect, a menu of symbols similar to what is illustrated in FIGS. 11A and 11B is displayed when the "1" key is selected. Tilting the device and selecting the "1" key again may cause a corresponding symbol to be output. After a symbol has been output, letters and numbers may be output, as described above, until the "1" key is selected again to display the symbol menu. Fully inverting the device, shaking the device, or otherwise moving the device in a manner that is not interpreted as a tilt of the device generates another menu.

A first output signal is output if the angular displacement is within the first tilt region when the selection is received, where a second output signal is output if the angular displacement is within the second tilt region when the selection is received. Furthermore, a third or fourth output signal is output if the angular displacement is within the third or fourth tilt region, respectively, when the selection is received.

If a plurality of first-axis tilt regions are defined about the first axis and a plurality of second-axis tilt regions are defined about the second axis, the one of the first plurality of output signals may be also output based upon the plurality of first-axis tilt regions and/or the plurality of second-axis tilt regions. When the selection is received, a first output signal may be output if the first-axis component is within a first first-axis tilt region and if the second-axis component is within a first second-axis tilt region, a second output signal may be output if the first-axis component is within a second first-axis tilt region and if the second-axis component is within the first second-axis tilt region, a third output signal may be output if the first-axis component is within the second first-axis tilt region and if the second-axis component is within a second second-axis tilt region, and/or a fourth output signal may be output if the first-axis component is within the second first-axis tilt region and if the second-axis component is within the second second-axis tilt region.

Alternatively, in another aspect, when the selection is received, a first output signal may be output if the first component is within a first first-axis tilt region and if the second-axis component is within a first second-axis tilt region, a second output signal may be output if the first component is within the first first-axis tilt region and if the second-axis component is within a second second-axis tilt region, a third output signal may be output if the first component is within the first first-axis tilt region and if the second-axis component is within a third second-axis tilt region, a fourth output signal may be output if the first component is within a second first-axis tilt region and if the second-axis component is within the first second-axis tilt region, a fifth output signal may be output if the first component is within the second first-axis tilt region and if the second-axis component is within the second second-axis tilt region, a sixth output signal may be output if the first component is within the second first-axis tilt region and if the second-axis component is within the third second-axis tilt region, a seventh output signal may be output if the first component is within a third first-axis tilt region and if the second-axis component is within the first second-axis tilt region, an eighth output signal may be output if the first component is within the third first-axis tilt region and if the second-axis component is within the second second-axis tilt region, and/or a ninth output signal may be output if the first component is within the third first-axis tilt region and if the second-axis component is within the third second-axis tilt region.

The output signal is displayed (step S310), and method 300 ends (step S311). The output signal is displayed on a display, such as display 105. In an alternate aspect, the output signal is not displayed.

In the FIG. 5 implementation, device 500 also includes display 505, which is used to present a graphical user interface ("GUI") to a user of device 500. The GUI enables a user of device 500 to perform functions that require the user to enter text into device 500. For example, the user may identify an entry for a person within a phonebook stored on device 500 by entering a name of the person. As another example, the user may add an entry for a person to the phonebook by entering information describing the person, such as the person's name and one or more phone numbers used by the person. Furthermore, the GUI enables the user to specify a text message that is to be sent from device 500 or to specify another textual note that is to be stored on device 500. Device 500 also displays a GUI that enables a user to specify a text message.

Interpreting control selections based on device orientations when the control selections are made increases the number of operations that may be performed with a single control selection. For example, each control selection may be interpreted in a number of manners that is equal to the number of distinct orientations of the device that may be detected. Furthermore, the orientation of the device may indicate how selection of control that do not correspond to any characters may be interpreted. Therefore, a user may be enabled to quickly perform relatively complex operations simply by tilting the device and selecting controls. For example, selecting the "*" key while the device is rolled to the left may cause a particular mode of text entry (e.g., numbers only, all capital letters) to be used for text entry until the next time the "*" key is selected when the device is rolled to the left. In another aspect, the tilt sensor effectuates tilt scrolling, such that, upon receipt of the selection of a control, a user interface is scrolled corresponding to the direction of the tilt. A forward pitch occurring at the time of control selection, for example, would result in the user interface, or a menu item on the user interface, scrolling upward.

According to another general aspect, a computer program product, tangibly stored on a computer-readable medium, is recited. The computer program product is operable to cause a computer to perform operations including determining a neutral position of a device in relation to at least a first axis, the device including at least a first control associated with a first plurality of output signals, and measuring an angular displacement of the device about at least the first axis. The computer program product is also operable to cause a computer to perform operations including receiving a selection of the first control, and outputting one of the first plurality of output signals based at least upon the selection and the angular displacement.

Finally, although a number of implementations have been described or exemplified as a telephone device, it is contemplated that the concepts related herein are by no means limited to telephony, and are in fact applicable to a broad variety of devices, including any device in which the number of controls is minimized due to device design and layout restrictions. Sample devices include computer keyboards, remote controls, watches, joysticks or game controllers, or other computer input or consumer electronic devices.

Accordingly, a number of implementations have been described. Nevertheless, it will be understood that various modifications may be made. For example, elements of different implementations may be combined, supplemented, or removed to produce other implementations. Further, various technologies may be used, combined, and modified to produce an implementation, such technologies including, for example, a variety of digital electronic circuitry, hardware, software, firmware, integrated components, discrete components, processing devices, memory storage devices, communication devices, lenses, filters, display devices, and projection devices.

What is claimed is:

1. A device comprising:
    a tilt sensor configured to automatically determine a neutral position of a device in relation to at least a first axis, and further configured to measure an angular displacement of the device about at least the first axis;
    at least a first control associated with a first plurality of output signals; and
    a processor configured to receive a selection of the first control and further configured to output one of the first plurality of output signals based at least upon the selection and the angular displacement,
    wherein the neutral position of the device is determined in relation to at least a second axis, orthogonal to the first axis,
    wherein the angular displacement includes a first-axis component and a second-axis component,
    wherein the neutral position of the device is automatically determined in relation to at least a third axis orthogonal to the first axis and the second axis, and
    wherein the angular displacement includes a third-axis component.

2. The device according to claim 1,
    wherein the tilt sensor determines the neutral position of the device in relation to at least a second axis, orthogonal to the first axis, and
    wherein the angular displacement includes a first-axis component and a second-axis component.

3. The device according to claim 2, wherein the first axis and the second axis intersect at a center of the device.

4. The device according to claim 1, wherein the first axis and the second axis intersect at a periphery portion of the device.

5. The device according to claim 1, wherein the device further includes at least second through tenth controls each associated with second through tenth pluralities of output signals, respectively.

6. The device according to claim 1, wherein the first control is a button.

7. The device according to claim 1, wherein the device is a telephone.

8. The device according to claim 1, wherein the tilt sensor is a gyroscope.

9. The device according to claim 1, further comprising a display configured to display the output signal.

10. The device according to claim 1, further comprising a display configured to display an indication of a defined tilt region corresponding to the angular displacement.

11. The device of claim 10, wherein the indication of the defined tilt region corresponding to the angular displacement further comprises the output signal associated with the selection and the angular displacement.

12. The device according to claim 1, further comprising a keyboard configured to input the selection.

13. The device according to claim 1, wherein the first axis and the second axis intersect within the device.

14. The device according to claim 1, wherein the first control is associated with at least six output signals.

15. The device according to claim 14, wherein the first control is associated with at least twenty six output signals, each output signal representing an alphabetic character.

16. The device according to claim 1, further comprising defining a plurality of tilt regions about the first axis, wherein one of the first plurality of output signals is also output based upon the plurality of tilt regions.

17. The device according to claim 16, further comprising more than three tilt regions within a 180° region about the first axis.

18. The device according to claim 1,
wherein, when the selection is received:
a first output signal is output if the first component is within a first first-axis tilt region and if the second-axis component is within a first second-axis tilt region,
a second output signal is output if the first component is within the first first-axis tilt region and if the second-axis component is within a second second-axis tilt region,
a third output signal is output if the first component is within the first first-axis tilt region and if the second-axis component is within a third second-axis tilt region,
a fourth output signal is output if the first component is within a second first-axis tilt region and if the second-axis component is within the first second-axis tilt region,
a fifth output signal is output if the first component is within the second first-axis tilt region and if the second-axis component is within the second second-axis tilt region,
a sixth output signal is output if the first component is within the second first-axis tilt region and if the second-axis component is within the third second-axis tilt region,
a seventh output signal is output if the first component is within a third first-axis tilt region and if the second-axis component is within the first second-axis tilt region,
an eighth output signal is output if the first component is within the third first-axis tilt region and if the second-axis component is within the second second-axis tilt region, and/or
a ninth output signal is output if the first component is within the third first-axis tilt region and if the second-axis component is within the third second-axis tilt region.

19. The device of claim 1, wherein the neutral position of the device is automatically determined after receiving the selection of the first control.

20. The device of claim 1, wherein the neutral position of the device is automatically determined during the selection of the first control.

21. The device of claim 1, wherein the tilt sensor further comprises a camera, and wherein the tilt sensor is further configured to measure the angular displacement of the device using optical flow.

22. The device of claim 1, wherein automatically determining the neutral position of the device further comprises determining the neutral position without requiring a manual calibration.

23. The device of claim 1, wherein the angular displacement of the device about at least the first axis is measured without referencing gravity.

24. The device of claim 1, wherein the one of the first plurality of output signals further comprises a menu navigation command.

25. The device of claim 1,
wherein the tilt sensor is further configured to detect shaking of the device; and
wherein the processor is further configured to output a second output signal based upon detecting the shaking of the device.

26. A device comprising:
a tilt sensor configured to automatically determine a neutral position of a device in relation to at least a first axis, and further configured to measure an angular displacement of the device about at least the first axis;
at least a first control associated with a first plurality of output signals; and
a processor configured to receive a selection of the first control and further configured to output one of the first plurality of output signals based at least upon the selection and the angular displacement,
wherein the tilt sensor is further configured to measure the angular displacement about at least first through third axis, and
wherein the processor is further configured to output the one of the first plurality of output signals based at least upon the angular displacement about the first through third axis.

27. A device comprising:
a tilt sensor configured to automatically determine a neutral position of a device in relation to at least a first axis, and further configured to measure an angular displacement of the device about at least the first axis;
at least a first control associated with a first plurality of output signals; and
a processor configured to receive a selection of the first control and further configured to output one of the first plurality of output signals based at least upon the selection and the angular displacement,
wherein the tilt sensor is further configured to detect shaking of the device; and
wherein the processor is further configured to output a second output signal based upon detecting the shaking of the device.

* * * * *